(12) United States Patent
Bontjer et al.

(10) Patent No.: US 8,474,373 B2
(45) Date of Patent: Jul. 2, 2013

(54) DEVICE FOR TREATING ELONGATE FOOD PRODUCTS WITH A CONDITIONED AIRFLOW

(75) Inventors: Marcus Bernhard Hubert Bontjer, Aarle Rixtel (NL); Sigebertus Johannes Jacobus Jozef Meggelaars, Eindhoven (NL); Paulus Johanus Maria Thoonsen, Vught (NL); Willem Kasper Van Den Berg, Oss (NL)

(73) Assignee: Stork Townsend B.V., Oss (NL)

( * ) Notice: Subject to any disclaimer, the term of this patent is extended or adjusted under 35 U.S.C. 154(b) by 1236 days.

(21) Appl. No.: 12/066,484

(22) PCT Filed: Aug. 21, 2006

(86) PCT No.: PCT/NL2006/050206
§ 371 (c)(1), (2), (4) Date: Apr. 17, 2008

(87) PCT Pub. No.: WO2007/032679
PCT Pub. Date: Mar. 22, 2007

(65) Prior Publication Data
US 2008/0250941 A1 Oct. 16, 2008

(30) Foreign Application Priority Data
Sep. 12, 2005 (NL) ...................................... 1029933

(51) Int. Cl.
*A47J 27/04* (2006.01)
*A21B 1/52* (2006.01)

(52) U.S. Cl.
USPC .................... 99/473; 99/467; 99/477; 99/478; 99/470; 99/483; 34/203; 34/205; 34/207; 34/211; 34/217; 34/236; 219/385; 219/386; 219/387; 219/388; 219/400

(58) Field of Classification Search
USPC ...... 99/467, 473, 477, 478, 470, 483; 34/203, 34/205, 207, 211, 217, 236; 219/388, 400, 219/385–387
See application file for complete search history.

(56) References Cited

U.S. PATENT DOCUMENTS

| 1,322,279 A | 11/1919 | Allsop, et al. |
| 3,220,333 A | 11/1965 | Davison |

(Continued)

FOREIGN PATENT DOCUMENTS

| DE | 10221254 A1 | 12/2003 |
| EP | 0266319 A2 | 5/1988 |

(Continued)

OTHER PUBLICATIONS

Hanatate Denki Seisakusho:KK, Patent Abstracts of Japan, vol. 2002, No. 08, Aug. 5, 2002, & JP 2002 119204 A, Apr. 23, 2002 abstract.

(Continued)

*Primary Examiner* — Shawntina Fuqua
(74) *Attorney, Agent, or Firm* — Zarley Law Firm, P.L.C.

(57) ABSTRACT

The present invention relates to a device for treating elongate food products in a process space using a conditioned airflow, comprising: a housing bounding the process space, with a feed opening arranged in the housing and a discharge opening arranged in the housing for respectively carrying elongate food products into the process space and discharging thereof from the process space, transport means for displacing the elongate food products through the process space, blowing means for generating an airflow in the process space, and conditioning means for conditioning the airflow.

14 Claims, 4 Drawing Sheets

U.S. PATENT DOCUMENTS

| | | | |
|---|---|---|---|
| 4,699,048 A | 10/1987 | Pavan et al. | |
| 5,520,013 A | 5/1996 | Kuo | |
| 5,942,265 A | 8/1999 | Roberds et al. | |
| 6,157,002 A * | 12/2000 | Schjerven et al. | 219/388 |
| 6,233,841 B1 | 5/2001 | Beach | |
| 6,360,452 B1 * | 3/2002 | De Gracia | 34/203 |
| 7,592,570 B2 * | 9/2009 | Yoder et al. | 219/388 |

FOREIGN PATENT DOCUMENTS

| | | | |
|---|---|---|---|
| EP | 0628252 A | | 12/1994 |
| EP | 0953286 A | | 11/1999 |
| EP | 1245919 | * | 10/2002 |
| EP | 1245919 A | | 10/2002 |
| FR | 2538887 A | | 7/1984 |
| FR | 2663509 A | | 12/1991 |
| FR | 2782786 A1 | | 3/2000 |
| GB | 2011334 A | | 7/1979 |
| GB | 2131936 A | | 6/1984 |
| NL | 1013164 C2 | | 5/2001 |
| WO | 0124646 A2 | | 4/2001 |

OTHER PUBLICATIONS

Daido Hoxan Inc., Patent Abstracts of Japan, vol. 1995, No. 07, Aug. 31, 1995 & JP 07 099950 A, Apr. 18, 1995 abstract.

* cited by examiner

DEVICE FOR TREATING ELONGATE FOOD PRODUCTS WITH A CONDITIONED AIRFLOW

BACKGROUND OF THE INVENTION

The present invention relates to a device for treating elongate food products in a process space using a conditioned airflow, comprising: a housing bounding the process space, with a feed opening arranged in the housing and a discharge opening arranged in the housing for respectively carrying elongate food products into the process space and discharging thereof from the process space, transport means for displacing the elongate food products through the process space, blowing means for generating an airflow in the process space, and conditioning means for conditioning the airflow.

In the treatment of elongate food products, and more particularly sausages, there is, depending on the type of product, a need to condition the products. Several examples of conditioning are: drying and heating the products. In the production of larger quantities of food products use is usually made of continuous production lines, wherein the products for conditioning are preferably moved through a determined process space. Used for this purpose according to the prior art are vertically disposed process spaces through which a conveyor belt with products moves in helical manner. The advantage of drying towers is that they can provide a great drying capacity on a limited floor area. On the other hand, the existing drying towers are often less simple to place in a conventional manufacturing area, and they are less advantageous in terms of energy.

The object of the present invention is to provide an improved device for treating elongate food products in a process space with a conditioned airflow with which, while retaining the advantages of the prior art, elongate food products can be treated in more effective manner. It is also an object to provide a device which can be installed in relatively simple manner.

SUMMARY OF THE INVENTION

The present invention provides for this purpose a device of the type stated in the preamble, wherein the feed opening and the discharge opening are arranged in opposite and substantially horizontally spaced-apart sides of the housing. Such a device has the advantage that the feed of products and the discharge of products take place on opposite sides of the housing (horizontally spaced-apart), and that the device is therefore logistically very simple to fit into a product flow. A further advantage is that the desired conditioning capacity is not necessarily linked to the height of the device. The device according to the invention can thus be placed in an existing production area which has a normal height of for instance 4-6 metres.

A return channel for air separated from the process space is preferably assembled with, or even partially bounded by, a wall of the housing. The energy efficiency of the device increased by such a measure. Undesired heat exchange of the device with the environment is after all limited in this way. Another advantage of this measure is the compact construction of the device resulting therefrom, whereby the outer dimension of the device can be limited. Yet another advantage is that this can result in reduced use of material in the construction of the device.

It is furthermore advantageous if the blowing means are adapted to generate a substantially horizontal airflow in the process space. This can be realized for instance by horizontally placing apart of an air feed opening connecting to the process space and an air discharge opening connecting to the process space. These two openings, air discharge opening and air feed opening, are preferably connected to each other outside the process space by the return channel. A blower can for instance be placed in the return channel such that it remains outside the process space, with the advantage, among others, that it is less likely to become contaminated.

In yet another advantageous embodiment variant, the transport means in the process space follow a transport path comprising a plurality of horizontally successive, substantially vertical transport routes. Thus created is a vertically zigzagging transport path which once again contributes toward the possibility of a compact construction of the device. The transport means herein follow an endless transport path, normally such that the transport path consists of at least two main routes: an actual transport route and a return route in which the transport means return in unloaded state to a starting situation in which they can once again be loaded.

It is also advantageous if a return part of the endless transport path which leads from the discharge opening to the feed opening lies substantially in the process space. The transport means thus remain substantially in a conditioned environment. The advantage hereof is that the transport means can thus be protected from undesired influences, such as for instance temperature differences (this can, depending on the conditions, prevent cooling or heating), contamination, moisture and so forth.

In yet another embodiment variant, the conditioning means comprise at least one heating element through which the airflow is carried and which is disposed in the process space such that the airflow is distributed thereby. The heating element can herein be provided with a large number of passage openings for passage of the airflow. Such a heating element has the advantage that it heats the airflow precisely at that position where heating is also essential; a position very close to the location where the airflow comes into contact with the products for conditioning. It is also advantageous that the function of heating of the airflow is combined with the distribution of the airflow over a larger area such that the flow speed is preferably more or less the same everywhere in the process space.

The conditioning means can also be provided with means for reducing the water content of the airflow. A specific air humidity can be of very great importance in determined processes. It is therefore desirable for instance in the drying of sausages that the airflow has a low air humidity (such as less than 25 grams of water per kilogram of air, or even less than 20 or 15 grams of water per kilogram of air). Conversely however, it may be desirable for an effective heat transfer during the heating of products that the air humidity is higher. The air humidity can be regulated for instance by (partially) venting air, cooling air or supplying water in the form of a mist or vapour.

It is a furthermore desirable that the housing is assembled in modular manner from connecting housing modules. The capacity of a device can be modified as required by applying a device with a modular assembly. It is also simpler to place or remove a device if this can be done in modules.

The transport means preferably comprise an endless chain, on which chain a plurality of elongate baskets engage. Such a chain can be easily advanced with the drive means required here for displacing the chain. The position of the chain can herein be controlled by means of guide means for the chain assembled with the housing. A chain can be given a sturdy form and can also be displaced without excessive frictional resistance. Elongate baskets can herein be mounted in simple manner between two parallel chains such that these baskets lie perpendicularly of the direction of transport. When the elongate baskets are herein coupled rigidly to one or more chains, it is possible without specific measures to change the orientation of the baskets as they follow the transport path. When passing through a vertically zigzagging transport route the baskets will thus assume changing orientations, as a result of which the products lying in the baskets can be displaced in the baskets. This is found to be particularly possible when the elongate baskets are of C-shaped cross-section; the products can thus roll over the inner surface and (depending on the remaining opening and the dimensions of the products) it is also possible to prevent the products rolling out of the baskets in undesired manner.

The blowing means can be formed by a simple blower. A readily controllable airflow can be maintained by one or more frequency-controlled fans. In addition, it is also possible to provide the device with integrated cleaning means, such as a washing installation, for cleaning at least a part of the transport means. Conversely, it is also possible to embody the cleaning means as a separate unit. In both cases it is desirable that the parts of the transport means of the device which come into contact with the elongate food products (such as for instance the baskets) can be cleaned by the cleaning means. These cleaning means can be placed such that the transport means, as they run through an endless transport path, can be cleaned by the cleaning means during each passage. Cleaning will have to take place particularly at a position where the transport means are empty, i.e. in a situation in which the device does not contain any elongate food products.

In yet another embodiment variant the blowing means for generating an airflow in the process space comprise an air feed which connects to the process space and which lies adjacently of the discharge opening for discharging elongate food products out of the process space, and comprise an air discharge which lies adjacently of the feed opening for carrying elongate food products into the process space. The products and the airflow will thus have opposing directions, which results in an increased conditioning efficiency. The air discharge can be provided with an extractor for the purpose of thus removing the desired air volume actively, and therefore in more readily controllable manner. The (pressure) conditions in the process space are then only a factor of lesser importance, or even of no importance at all, in the regulation of the air outflow.

BRIEF DESCRIPTION OF THE DRAWINGS

The present invention will be further elucidated on the basis of the non-limitative exemplary embodiments shown in the following figures. Herein.

DETAILED DESCRIPTION OF A PREFERRED EMBODIMENT OF THE INVENTION

Figure 1:
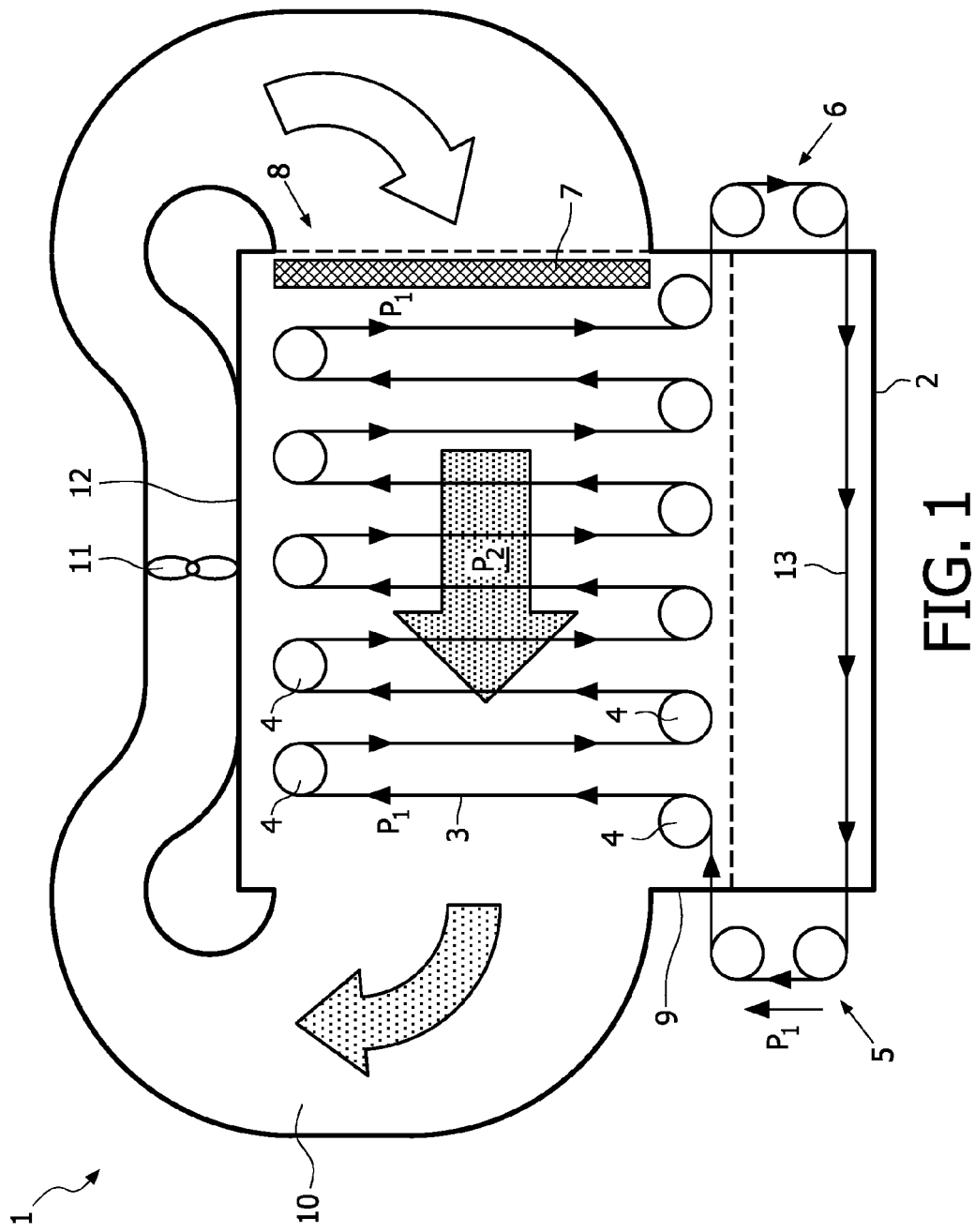
FIG. 1 shows a schematic side view of a device according to the invention.

FIG. 1 shows a schematically represented drying device 1 with a housing 2, through the interior of which an endless conveyor 3 is displaceable as according to the arrows $P_1$. The transport route covered by conveyor 3 is defined by guide rollers 4 such that it comprises a plurality of successive vertical route parts. At a feed position 5 the endless conveyor 3 is loaded with food products for drying, such as more particularly sausages. After passing through a drying route, the sausages are then taken off (or out of) endless conveyor 3 at a discharge position 6.

Heated air is carried through housing 2 as according to arrow $P_2$ in counter-flow to conveyor 3. Provided for this purpose is a heating element 7 which heats the air at an air supply side 8 of housing 2 shortly before it comes into contact with the loaded conveyor 3, but which also, because of the porous construction thereof, distributes the airflow uniformly over the cross-section of housing 2. The air leaves housing 2 at an air discharge side 9 in a state which is less warm during normal operation and in which the heated air is fed to housing 2 at air supply side 8. The air discharged on air discharge side 9 enters a return channel 10 and is fed back via a blower 11 to air supply side 8 of housing 2. Return channel 10 connects along a part of the length to housing 2. The advantage of connecting housing 2 and return channel 10 is that, due to the common intermediate wall 12, relatively little heat is lost, and that drying device 1 has a compact form. As can also be seen in this figure, a return part 13 of endless conveyor 3 also runs through housing 2, this return part 13 lying between the discharge position 6 and feed position 5 of the sausages. The advantage of placing this return part 13 in housing 2 is that it will not cool (or will only do so to a limited extent) during the return movement.

Figure 2:
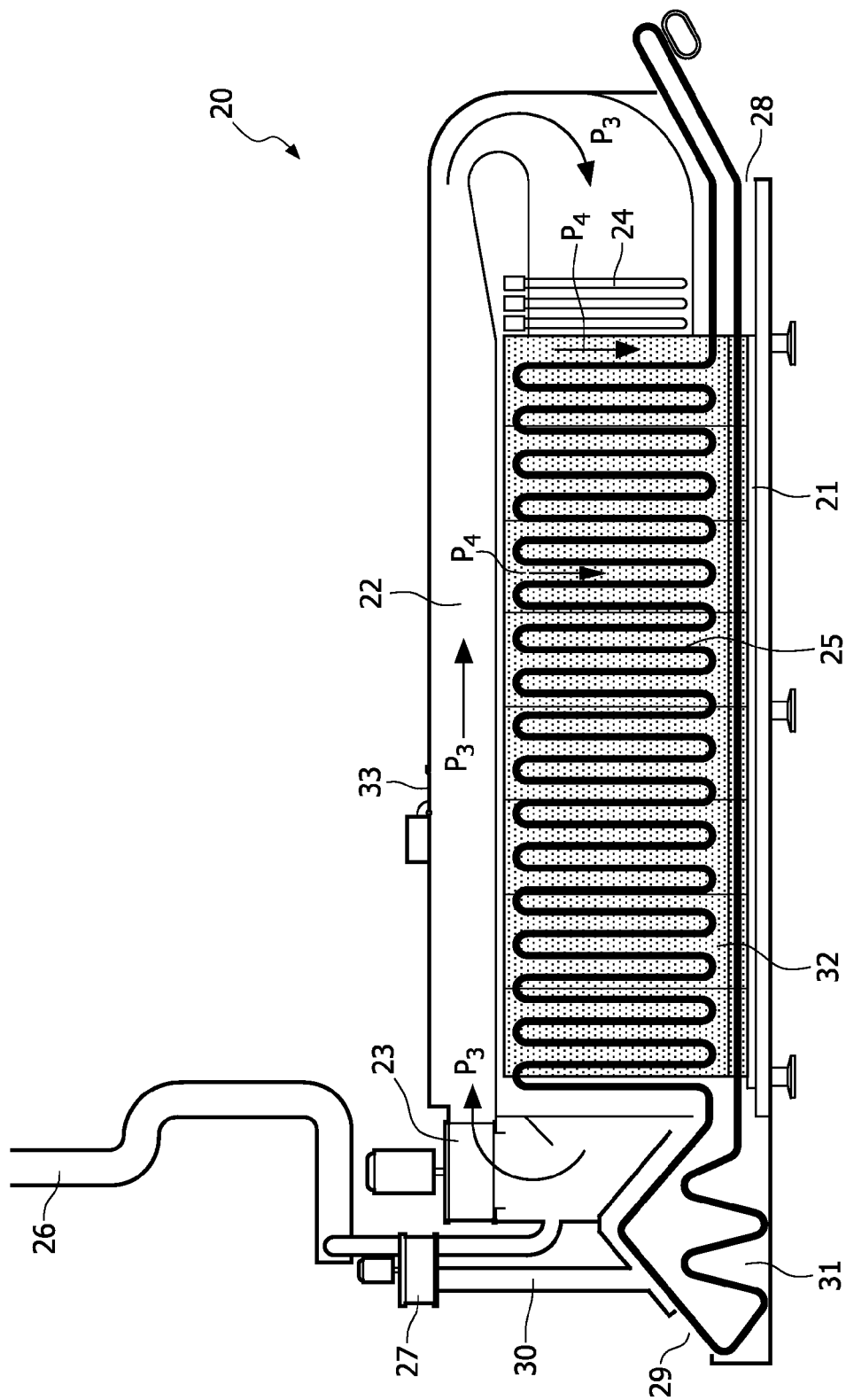
FIG. 2 shows a cut-away side view of a first embodiment variant of the device according to the invention.

FIG. 2 shows a cross-section through an exemplary embodiment of a drying device 20 with a housing 21 to which connects a return channel 22. The airflow is blown by a blower 23 as according to arrow $P_3$ through return channel 22 and then passes first through a heating element 24 in housing 21. Running through housing 21 in zigzag configuration is a conveyor 25, for instance provided with baskets, not shown in this figure, for carrying sausages, this in a direction $P_4$ such that conveyor 25 and the airflow move through housing 21 in opposing directions. After leaving housing 21, the airflow fed back once again as according to arrow $P_3$ to housing 21 by blower 23 and return channel 22 in order to run through a new cycle.

By means of an inlet 26 outside air can be drawn with a blower 27 into drying device 20 so as to thus replenish air flowing out of device 20. The outflow of process air from device 20 will already take place partially through openings 28, 29 through which sausages are respectively discharged and supplied. In order to prevent undesirably large volumes of (heated) process air flowing out of drying device 20 (which is undesirable in energy terms), air can be supplied through a separate feed 32 to a buffer area 31 located between the actual process space 32 in housing 21 and the opening 29 through which sausages are supplied to conveyor 25. A washing device, not further shown here, for conveyor 25 can for instance also be accommodated in this buffer area 31. For a controlled venting of device 20, a controllable venting 33 can for instance be arranged in return channel 22, but also at a different location as required. Using such a controlled venting 33 a part of the process air can for instance be discharged in order to thus remove water from device 20 and prevent too high an air humidity of the process air in device 20.

Figure 3:
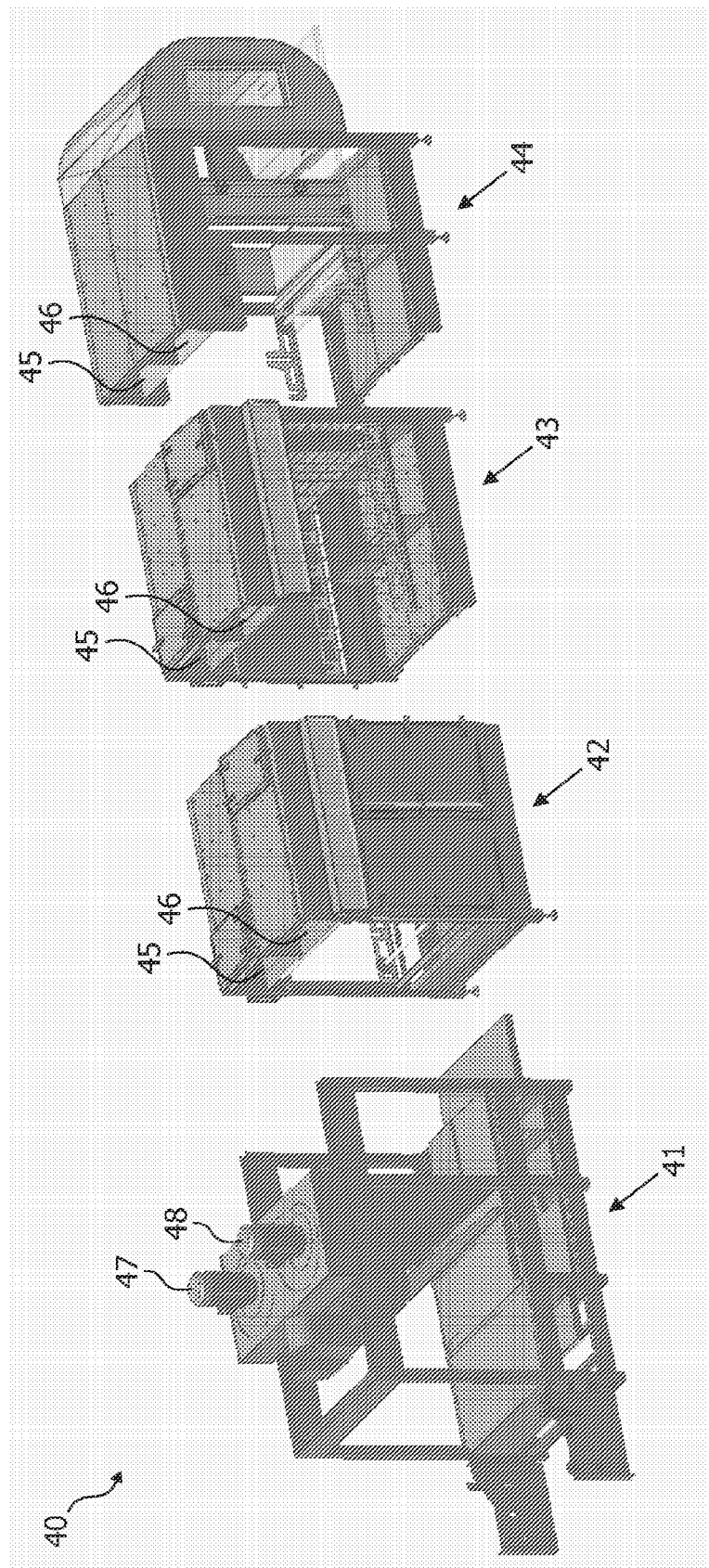
FIG. 3 shows a perspective view, subdivided into modules, of a second embodiment variant of the device according to the invention.

FIG. 3 shows in perspective a drying device of 40 taken apart into modules 41, 42, 43, 44 which greatly resembles the drying device 20 as shown in FIG. 2. The modular construction of device 40 has the advantage that it can readily be given a longer or shorter form as required by respectively adding or removing middle modules 42, 43. The capacity of device 40 can thus be increased or decreased in simple manner. The modules furthermore simplify transport, installation, maintenance and the removal of device 40. Reference is made to the description relating to FIG. 2 for a more detailed description. A clear difference from the device 20 shown in FIG. 2 is that drying device 40 comprises return channels 45, 46 in dual form which are fed by two separate blowers 47, 48.

Figure 4:
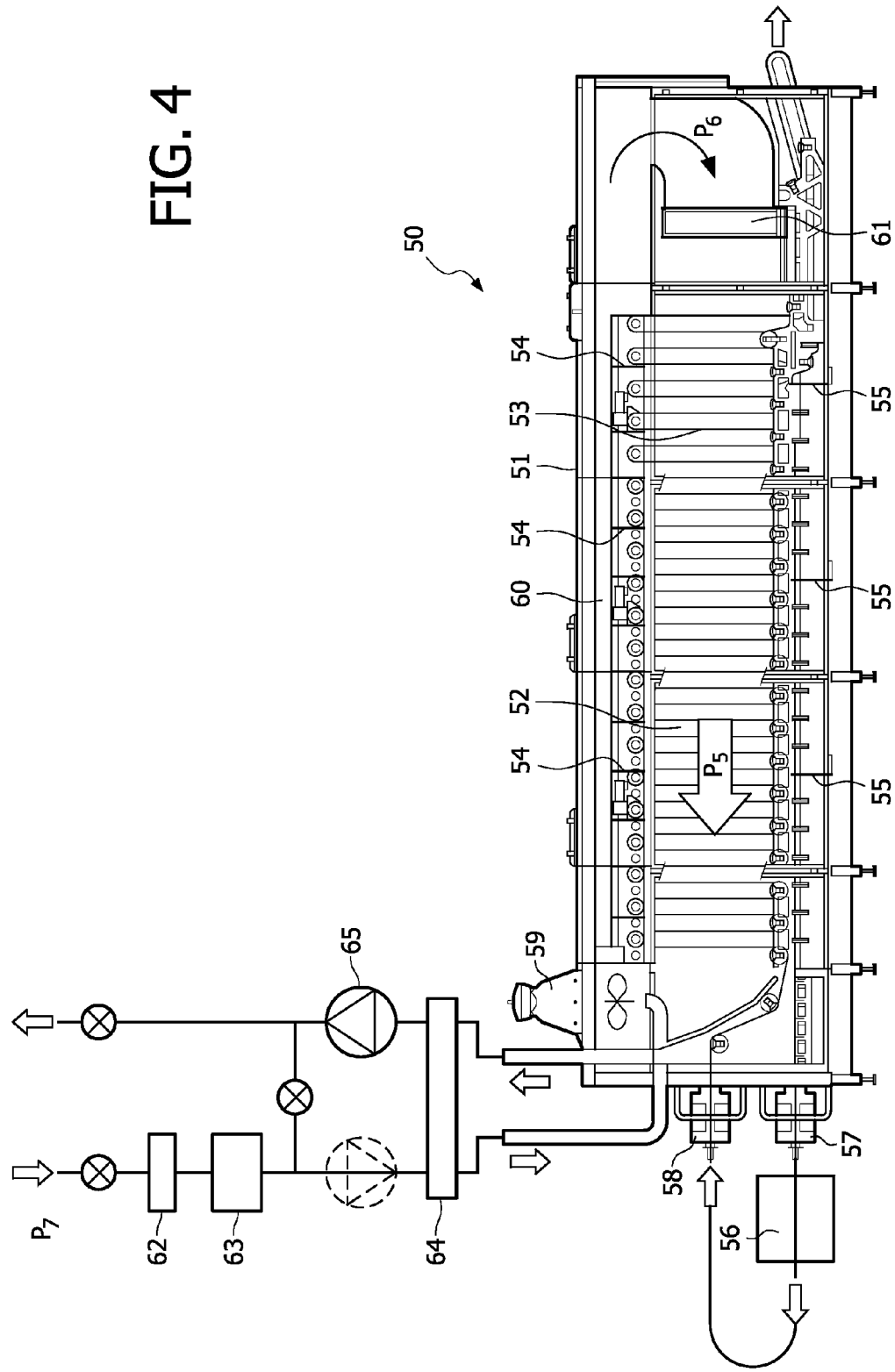
FIG. 4 shows a cut-away side view of a third embodiment variant of the device according to the invention.

FIG. 4 shows a drying device 50 with a housing 51 which encloses a process space 52. A conveyor 53 is displaceable through drying space 52 analogously to the conveyors as shown in FIGS. 1 and 2. In order to prevent a substantial part of the process air flowing to the top side and/or bottom side of process space 52, and thereby having hardly any interaction with the products for drying carried along by conveyor 53, baffles 54, 55 are placed respectively at both the top side and the bottom side of process space 52 which ensure that the airflow ($P_5$) comes into contact in effective manner with the products for drying. The drying device 50 shown in this figure connects to an external washing machine 56. Now that conveyor 53 is washed outside housing 51, air sluices 57, 58 are arranged in housing 51 through which conveyor 53 can be carried respectively out of or into housing 51 without simultaneously also creating an airflow into or out of drying space 52.

New air is drawn in by a fan 59 and carried through a return channel 60 as according to arrow $P_6$ to a heating element 61. Before being carried into return channel 60, the outside air $P_7$ drawn in by fan 59 is first guided through a filter 62 and a cooling 63. The air is then preheated by a heat exchanger (for instance in the form of a heat wheel 64). Process air can be discharged with underpressure out of the process space by a fan 65, after however first being carried through heat wheel 64 so as to thus extract a part of the heat from the discharged air.

What is claimed is:

1. Device for treating elongate food products in a process space using a conditioned airflow, comprising:
    a housing bounding the process space, with a feed opening arranged in the housing and a discharge opening arranged in the housing for respectively carrying elongate food products into the process space and discharging thereof from the process space,
    transport means for displacing the elongate food products through the process space,
    blowing means for generating an airflow in the process space;
    conditioning means for conditioning the airflow,
    wherein the feed opening and the discharge opening are arranged in opposite and substantially horizontally spaced-apart sides of the housing;
    wherein the conditioning means comprise at least one heating element through which the airflow is carried and which is disposed in the process space such that the airflow is distributed thereby,
    wherein the heating element is provided with a plurality of passage openings for passage of the airflow; and
    wherein the conditioning means are also provided with means for regulating the air humidity of the airflow to a higher or lower air humidity.

2. Device as claimed in claim 1, characterized in that a return channel for air separated from the process space is at least partially assembled with a wall of the housing.

3. Device as claimed in claim 2, characterized in that the return channel for air separated from the process space is at least partially bounded by a wall of the housing.

4. Device as claimed in claim 1, characterized in that the transport means in the process space follow a transport path comprising a plurality of horizontally successive, substantially vertical transport routes.

5. Device as claimed in claim 1, characterized in that the transport means follow an endless transport path.

6. Device as claimed in claim 5, characterized in that a return part of the endless transport path which leads from the discharge opening to the feed opening lies substantially in the process space.

7. Device as claimed in claim 1, characterized in that the housing is assembled in modular manner from connecting housing modules.

8. Device as claimed in claim 1, characterized in that the transport means comprise an endless chain, on which chain a plurality of elongate baskets engage.

9. Device as claimed in claim 8, characterized in that the elongate baskets lie perpendicularly of the direction of transport.

10. Device as claimed in claim 8, characterized in that the elongate baskets are coupled rigidly to the chain.

11. Device as claimed in claim 8, characterized in that the elongate baskets are of C-shaped cross-section.

12. Device as claimed in claim 1, characterized in that the blowing means comprise a blower.

13. Device as claimed in claim 1, characterized in that the blowing means for generating an airflow in the process space comprise an air feed which connects to the process space and which lies adjacently of the discharge opening for discharging elongate food products out of the process space, and comprise an air discharge which lies adjacently of the feed opening for carrying elongate food products into the process space.

14. Device as claimed in claim 13, characterized in that the air discharge connects to an extractor for the purpose of thus actively removing air from the process space.

* * * * *